Aug. 23, 1932. V. BENDIX 1,872,874

BRAKE

Original Filed April 27, 1926

INVENTOR.
Vincent Bendix
BY
M. W. McConkey
ATTORNEY

Patented Aug. 23, 1932

1,872,874

UNITED STATES PATENT OFFICE

VINCENT BENDIX, OF SOUTH BEND, INDIANA, ASSIGNOR TO BENDIX BRAKE COMPANY, OF SOUTH BEND, INDIANA, A CORPORATION OF ILLINOIS

BRAKE

Original application filed April 27, 1926, Serial No. 26,036. Divided and this application filed June 26, 1930. Serial No. 463,909.

This invention relates to wheel brakes and more particularly to operating means for swiveled wheel brakes and is a division of my co-pending application Serial No. 26,036, filed April 27th, 1926.

One object of the invention is to provide a convenient arrangement of means for operating swiveled or steering wheel brakes.

Another object of the invention is to provide a brake operating mechanism that permits the brake cam to be placed nearer the axis of rotation of the wheel.

Another object of the invention is to provide a brake operating mechanism involving gears or gear sectors.

Figure 1:
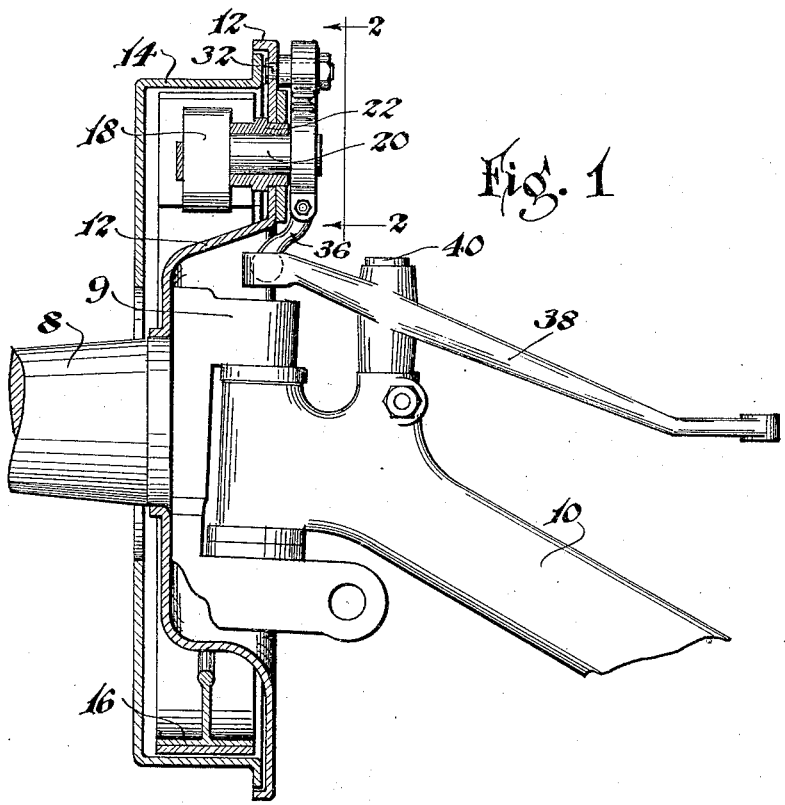
Figure 2:
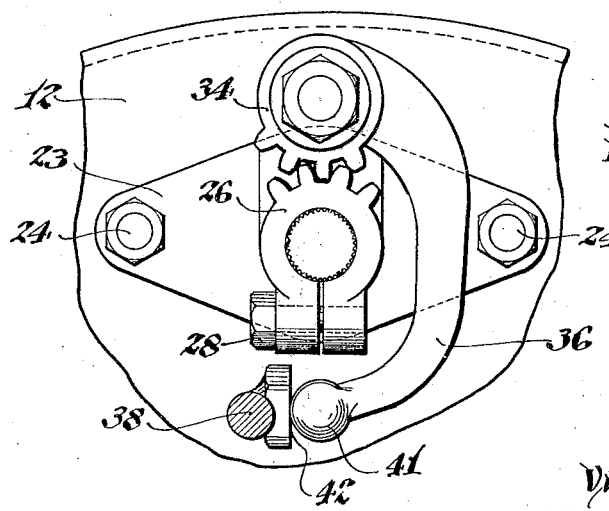

Other objects as well as novel and desirable details of construction will be apparent from the following description of one illustrative embodiment of the invention, shown in the accompanying drawing, in which:

Figure 1 is a sectional elevation of a portion of a steering wheel and axle upon which the improved operating mechanism is installed, and Figure 2 is a fragmental enlarged view taken in the direction of lines 2—2 of Figure 1.

In the arrangement illustrated, 8 is a wheel spindle forming a part of knuckle 9, swiveled upon the axle 10 to swivel about a vertical axis. A backing plate or support 12 is secured to the knuckle 9 and cooperates with the rotatable drum 14 to enclose the brake shoes 16 and the operating mechanism.

The brake shoes 16 are expanded into contact with the drum 14 by a cam 18 having a shaft 20 rotatably supported in a bearing 22, mounted upon the support or backing plate by means of bracket 23 and bolts 24. On the outer serrated end of shaft 20 is secured a gear sector 26 which is clamped thereon by a bolt 28. The mating serrations of the sector and shaft permit of any desired adjustment and after the correct position of the parts has been secured, the sector is tightly locked to the shaft by the clamp bolt 28.

Immediately above the shaft 20 is mounted a second shaft 32 which is secured to the backing plate 12 by any desired means such as riveting. A gear sector 34 having an arm 36 is rotatably mounted upon the shaft 32, the teeth of the sector 34 being arranged to mate with the teeth on sector 26. The arm 36 projects downwardly into a position approximately coincident with the swiveling axis of the knuckle and is engaged by the lever 38 mounted upon the axle 10 to rotate about a vertical axis 40.

The lever 36 preferably has a spherical end 41 which contacts with a flatted portion 42, formed upon the lever 28.

In the operation of the mechanism shown, movement of the lever 42 toward the right as viewed in Figure 2 rotates the arm 36 and sector 34 in a counterclockwise direction, which rotates the sector 30 and cam 18 in the reverse direction to expand the brake shoes 16.

It may be readily seen that in the arrangement shown and described, the lever 36 may have a greater length than if it were directly connected to the shaft 20 and that the mechanical advantage between the horizontal lever 38 and the cam 18 is increased.

While I have illustrated and described somewhat in detail one embodiment of my invention, it is not my intention to limit the scope of the invention to this particular embodiment or otherwise than by the terms of the appended claims.

Having thus described the features of the invention, what I claim as new and desire to secure by Letters Patent is:

1. Brake mechanism comprising, in combination, retarding means and an adjacent support, a rock shaft arranged to operate the retarding means and journaled in the support, an arm mounted on said support and curved around said shaft and pivoted for movement about an axis outside of and adjacent the rock shaft, interengaging parts one of which is mounted on the rock shaft, and the other of which is operated by the arm, and means for rocking the arm to operate said retarding means.

2. Brake mechanism comprising, in combination, a support, retarding means adjacent to the support, a rock shaft arranged to operate said means and journaled in the support, an operating part adjustably secured on the rock shaft, a rock arm mounted on the support and curved around the shaft and having adjacent one end a part engaging said operating part on the rock shaft, and means adjacent the other end of the arm for rocking the arm to operate said retarding means.

3. A brake comprising, in combination, retarding means and an adjacent support, a rock shaft journaled in the support and having a member provided with teeth secured at its end, an operating arm mounted on the support and movable about an axis outside of and adjacent the rock shaft, and a part having teeth meshing with the teeth of the part on the rock shaft and arranged to be operated by swinging the arm, the shaft being arranged substantially in line with and between the ends of said arm.

4. Brake mechanism comprising, in combination, retarding means and an adjacent support, a rock shaft projecting through the support arranged to operate the retarding means and journaled in the support, an arm pivoted for movement in a plane adjacent and parallel to the support about an axis outside of and adjacent the rock shaft and curved about the shaft with its ends substantially in line with the shaft, inter-engaging parts one of which is mounted on the rock shaft and the other of which is operated by the arm, and means for rocking the arm to operate said retarding means.

5. Brake mechanism comprising, retarding means and an adjacent support, a rock shaft arranged to operate the retarding means, said shaft being journaled on the support, gear means on the shaft, a second gear means journaled on the support in meshed relation to the first gear means, an arm secured to the second gear means projecting toward the first gear means, and means for moving the arm to operate the retarding means.

In testimony whereof, I have hereunto signed my name.

VINCENT BENDIX.